May 12, 1936.  R. W. SHOEMAKER  2,040,155
COUPLING JOINT FOR TUBES, ETC
Filed Dec. 8, 1934  2 Sheets-Sheet 1
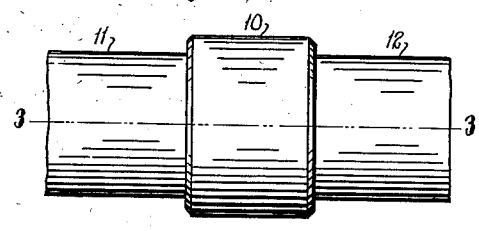
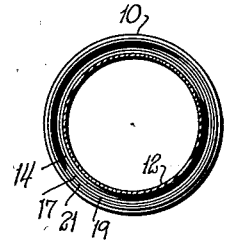
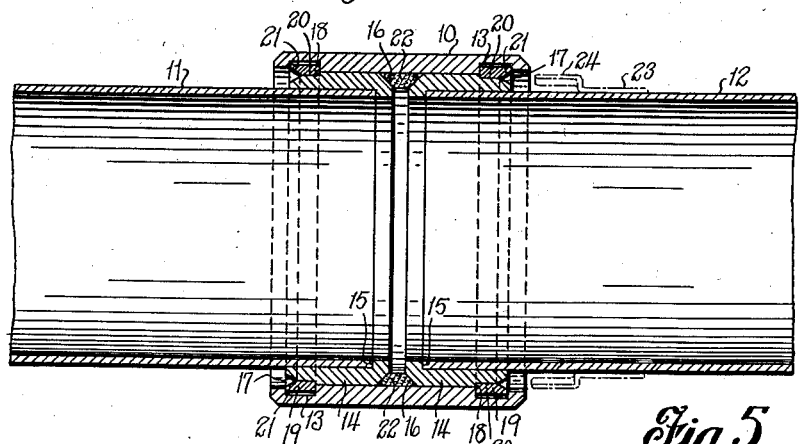
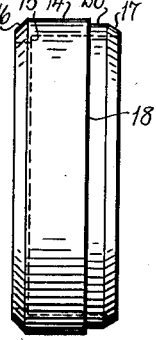
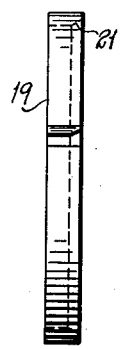
-Inventor-
Richard W. Shoemaker
-Attorneys-
Seymour Earle & Nichols May 12, 1936.  R. W. SHOEMAKER  2,040,155
COUPLING JOINT FOR TUBES, ETC
Filed Dec. 8, 1934  2 Sheets-Sheet 2
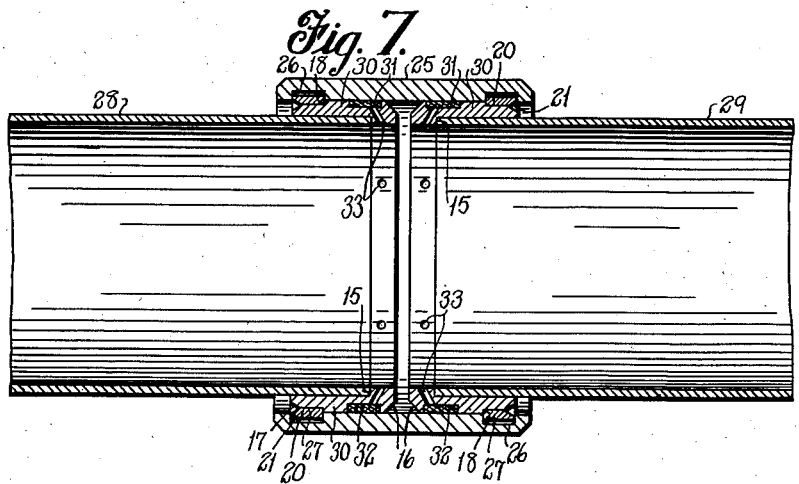
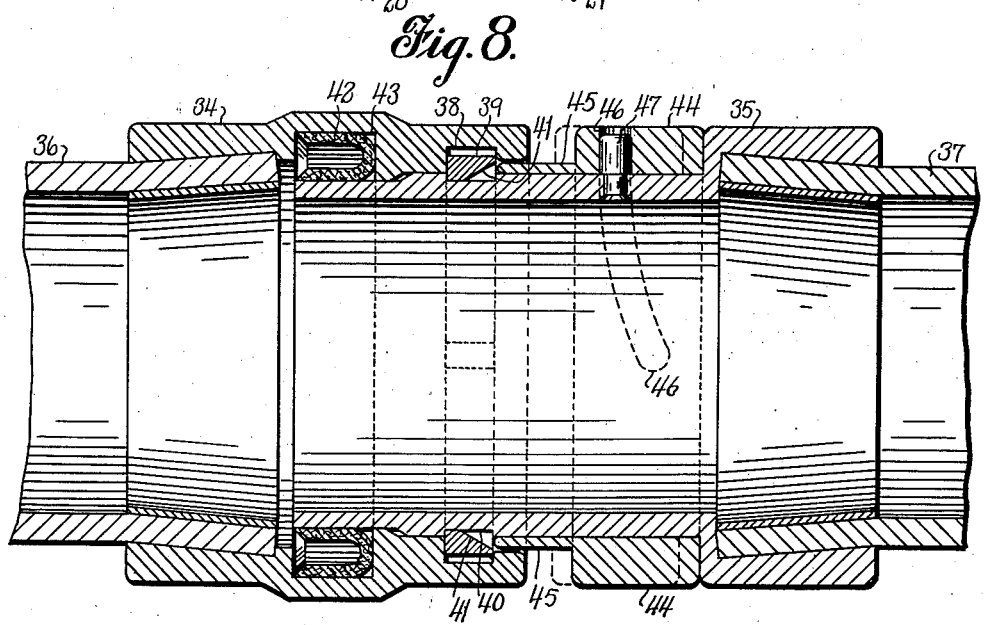
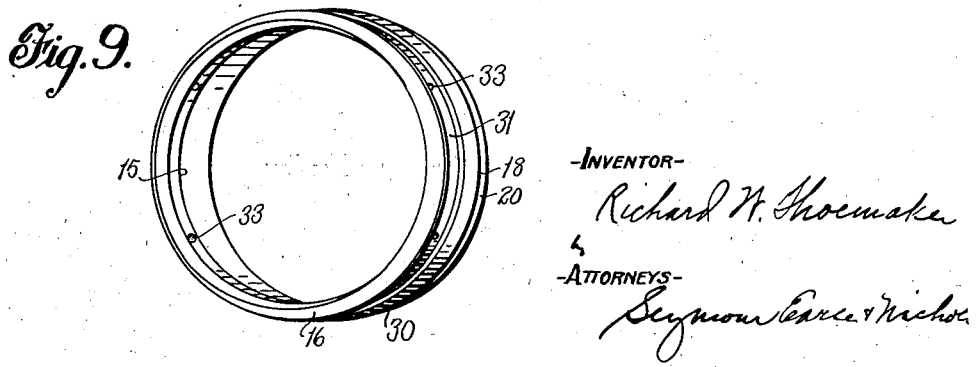
-INVENTOR-
Richard W. Shoemaker
-ATTORNEYS-
Seymour Pearce & Nichol Patented May 12, 1936

2,040,155

UNITED STATES PATENT OFFICE 2,040,155

COUPLING JOINT FOR TUBES, ETC.

Richard W. Shoemaker, Waterbury, Conn., assignor to The Chase Companies, Incorporated, Waterbury, Conn., a corporation Application December 8, 1934, Serial No. 756,593

10 Claims. (Cl. 285—193)

This invention relates to an improvement in coupling-joints, and particularly to coupling-joints especially adapted for joining tubes or pipes of copper or other non-ferrous material.

One of the objects of the present invention is to provide a superior coupling-joint, by means of which two tubes or other members may be rapidly and conveniently coupled together.

A further object is to provide a superior coupling-joint which is both simple and convenient to use and which at the same time is fluid-tight.

Another object is to provide a superior quick-acting coupling-joint which may be produced at a relatively-low cost for manufacture.

A still further object is to provide a quick-acting coupling-joint having provision for permitting relative movement between the coupled members, to thereby compensate for expansion and contraction.

Another object is to provide a quick-acting coupling-joint which, while readily assemblable, is proof against disassembly by the use of ordinary skill and tools, but which may be readily uncoupled by specially designed means.

With the above and other objects in view, as will appear to those skilled in the art from the following, considered in conjunction with the accompanying drawings and appended claims, the present invention includes all features disclosed therein which are novel over the prior art.

In the accompanying drawings:

Fig. 1 is a view in side elevation of a coupling-joint embodying the present invention;

Fig. 2 is an end view thereof;

Fig. 3 is a central longitudinal sectional view taken on the line 3—3 of Fig. 1;

Fig. 4 is a view in side elevation of one of the coupling-heads;

Fig. 5 is a similar view of one of the flexible coupling-rings;

Fig. 6 is a perspective view of an expanding fixture for releasing the coupling-rings;

Fig. 7 is a view in central longitudinal section illustrating another form of coupling-joint;

Fig. 8 is a similar view illustrating still another form of coupling-joint; and

Fig. 9 is a perspective view of one of the coupling-heads employed in the joint shown in Fig. 7.

The form of the present invention shown in Figs. 1 to 5 inclusive comprises a coupling-sleeve 10 which serves to couple together two tubes 11 and 12 and which is provided with two corresponding annular coupling-grooves 13—13 in its interior, one of the said coupling-grooves being located adjacent each of the respective opposite ends of the coupling-sleeve as shown.

Each tube has secured over its inner end by soldering, brazing, or otherwise, a ring-like coupling-head 14 sized to telescopically fit within the adjacent end of the coupling-sleeve 10. Each coupling-head is provided in its interior with an outwardly-facing stop-shoulder 15 designed for engagement with the adjacent end of a tube and is also formed upon its inner corner with a bevel 16 for the purpose as will hereinafter appear. Each coupling-head is also provided at its outer corner with a bevel 17 and adjacent thereto with an outwardly-facing coupling-shoulder 18.

Fitting within each of the coupling-grooves 13 of the coupling-sleeve 10 is a split flexible coupling-ring 19 formed of hard bronze or other suitable resilient material and having its interior sized to normally snugly hug the periphery of the reduced portion 20 of one of the complementary coupling-heads which extends intermediate the bevel 17 and the coupling-shoulder 18 thereon. Each flexible coupling-ring 19 is also formed with a bevel 21 complementing the bevel 17 of the adjacent one of the coupling-heads 14.

In assembling the coupling illustrated in Figs. 1 to 5 inclusive, a coupling-ring is contracted and inserted into each of the coupling-grooves 13 in the interior of the coupling-sleeve 10. A coupling-head 14 is previously secured by solder or otherwise to the end of each of the tubes 11 and 12. When one of the tubes 11 or 12, together with its coupling-head, is forced axially into one end of the coupling-sleeve 10, the bevel 16 of the said coupling-head will engage and expand the adjacent coupling-ring outwardly into its groove 13, which groove is sufficiently deep for the accommodation of the said ring under the circumstances just recited. The continued movement of the head into the sleeve will ultimately shift its outwardly-facing coupling-shoulder 18 inwardly of the inner edge of the coupling-ring in question, thus permitting the coupling-ring to contract onto the reduced portion 20 of the head and thus interpose itself, so to speak, between the coupling-shoulder 18 and the outer wall of the groove 13, which wall forms a complementary coupling-shoulder.

When both coupling-heads have been inserted into the coupling-sleeve 10 from the respective opposite ends thereof, they will occupy approximately the position shown in Fig. 3 and may, if desired, engage and slightly compress a packing-ring 22 to make the coupling fluid-tight. As thus constructed and arranged, the packing-ring 22 will yield sufficiently to permit the tubes 11 and 12 to expand longitudinally in the event that they are subjected to heat.

When assembled in the manner above described, it is extremely difficult to expand one of the coupling-rings 19 by means of ordinary tools to effect the release of the coupling-head when it coacts. This makes a desirable joint in situations where the same might be subjected to tampering by unauthorized persons.

To provide for the expansion of a given coupling-ring 19 when it is desired to uncouple a joint, an instrument of the type shown in Fig. 6 may be employed. The instrument referred to comprises a flexible split band 23 of spring-metal or the like capable of being snapped over the tubes 11 or 12. The said band 23 has offsetting from one edge a plurality of expanding fingers 24 having their outer edges rounded and adapted to engage the complementary bevels 17 and 21 respectively formed upon the coupling-heads 14 and the coupling-rings 19 to retire or expand the coupling-ring in question outwardly into its coupling-groove 13 to thus permit the withdrawal of the coupling-head 14, with which it coacts, from the coupling-sleeve 10.

In Fig. 7 is shown a coupling-sleeve 25 substantially corresponding to the coupling-sleeve 10 before described and, like the same, having complementary coupling-grooves 26—26 in its interior for the reception of flexible coupling-rings 27. The two tubes 28 and 29 which it is desired to couple each have secured to their adjacent ends coupling-heads 30 generally corresponding to the coupling-heads 14 before described, save that each is provided in its periphery with an annular groove 31 receiving an annular packing-ring 32 and having one or more ports 33 leading inwardly from the said grooves.

The coupling shown in Fig. 7 may be assembled and released in much the same manner as that described for the coupling of the preceding figures, and when pressure exists in the interior of the tubes 28 and 29, the ports 33 will permit such pressure to exert itself to snugly engage the outer surfaces of the packing-rings 32 with the interior of the coupling-sleeve 25 to thus provide a fluid-tight joint and, at the same time, permit of relative longitudinal movement between the respective tubes 28 and 29 and the coupling-sleeve 25.

The couplings hereinbefore described are each adapted to interconnect two corresponding tubes or pipes to each other, but it would be obvious without further illustration that a single tube or the like may be coupled to any desired fitting, instead of to another tube.

In Fig. 8 is illustrated a coupling which is especially suited for use in coupling fire hose together or in other situations where quick release, as well as quick attachment, is desirable.

The coupling referred to comprises a female terminal 34 and a complementary interfitting male terminal 35 respectively having attached thereto in any suitable manner hose 36 and 37. The terminal 34 is provided in its interior adjacent its outer end with a coupling-groove 38 receiving a resilient split coupling-ring 39, which ring is also adapted to extend into an annular groove 40 formed upon the periphery of the terminal 35. The coupling-ring 39 is suitably beveled as at 41 and is normally held in the groove 38 by its own tension, but is capable of being expanded outwardly when the terminal 35 is inserted into the terminal 34 and ultimately when the parts are in their correct relative longitudinal positions contracts into the peripheral groove 40 in the terminal 35 to thus securely interlock the two said terminals together.

A packing-ring 42 of U-shaped or other suitable form in cross-section is normally located within a groove 43 formed within the interior of the terminal 34 and is adapted when the two coupling-members 34 and 35 are assembled to engage the periphery of the terminal 35 and prevent the escape of water or other fluid between the telescoped surfaces of the two said terminal members.

To provide for the rapid and convenient retirement of the coupling-ring 39, a releasing-collar 44 is mounted upon the reduced forward end of the male terminal 35 and has a relatively-thin annular extension 45 forwardly offsetting for engagement with the bevel 41 of the coupling-ring 39. The periphery of the collar 44 may be suitably knurled for convenient gripping and is formed with a helical slot 46 receiving a stud 47 riveted to or otherwise secured to the terminal 35 so as to offset therefrom as shown.

When the releasing-collar 44 is suitably rotated, the coacting slot 46 and stud 47 will cause the said collar to move in a helical path laterally toward the coupling-ring 39 to engage the extension 45 of the said collar with the bevel 41 and forcibly retire or expand the said coupling-ring outwardly into its groove 38 and permit the axial separation of the terminals 34 and 35 and hence the disconnection of the hose 36 and 37.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

I claim:

1. A fluid-conducting coupling-joint comprising: a first-member having a transverse coupling-shoulder in its interior; a second-member adapted to telescopically interfit with the said first-member and having a transverse coupling-shoulder oppositely facing with respect to the coupling-shoulder of the said first-member; and a laterally-shiftable coupling-member having a beveled edge and normally interposed between the respective coupling-shoulders of the two said members and disengageable from one of the said coupling-shoulders to release the two said members by being moved in a substantially-radial direction; the beveled edge of the said laterally-shiftable coupling-member being accessible for being moved as described by an instrument movable between the two said telescoped members.

2. A fluid-conducting coupling-joint comprising: a first-member having a transverse coupling-shoulder in its interior; a second-member adapted to telescopically interfit with the said first-member and having a transverse coupling-shoulder oppositely facing with respect to the coupling-shoulder of the said first-member; and an expansible and contractible split coupling-ring normally interposed between the respective coupling-shoulders of the two said members and disengageable from one thereof by flexing the ring to change its radius; the said coupling-ring being accessible for being flexed as described by an instrument movable between the two said telescoped members.

3. A fluid-conducting coupling-joint comprising: a first-member having a transverse coupling-shoulder in its interior; a second-member adapted to telescopically interfit with the said first-member and having a transverse coupling-shoulder oppositely facing with respect to the coupling-shoulder of the said first-member; and an expansible and contractible split coupling-ring having a beveled edge and normally interposed between the respective coupling-shoulders of the two said members and disengageable from one thereof by flexing the ring to change its radius; the beveled edge of the said coupling-ring being accessible for being flexed as described by an instrument movable between the two said telescoped members.

4. A fluid-conducting coupling-joint comprising: a first-member having a transverse annular coupling-shoulder in its interior; a second-member adapted to telescopically interfit with the said first-member and having a transverse annular coupling-shoulder oppositely facing with respect to the annular coupling-shoulder of the said first-member; and an expansible and contractible split coupling-ring normally interposed between the respective annular coupling-shoulders of the two said members and disengageable from one thereof by flexing the ring to change its radius; the said coupling-ring being accessible for being moved as described by an instrument movable between the two said telescoped members.

5. A coupling-joint comprising: a coupling-sleeve having two complementary inwardly-facing coupling-shoulders in its interior; two substantially-corresponding telescoping members inserted into the respective opposite ends of the said coupling-sleeve and each having an outwardly-facing coupling-shoulder; and a laterally-shiftable coupling-member interposed between the coupling-shoulders of each of the said telescoping members and the adjacent one of the coupling-shoulders in the interior of the said coupling-sleeve.

6. A coupling-joint comprising: a first-member having a transverse coupling-shoulder in its interior; a second-member adapted to telescopically interfit with the said first-member and having a transverse coupling-shoulder oppositely facing with respect to the coupling-shoulder of the said first-member and also having an annular gasket-receiving groove in its periphery; a gasket installed in the gasket-receiving groove of the said second-member and engageable with the interior surface of the said first-member; and a laterally-shiftable coupling-member normally interposed between the respective coupling-shoulders of the two said members and disengageable from one of said coupling-shoulders to release the two said members by being moved in a substantially-radial direction.

7. A coupling-joint comprising: a first-member having a substantially-annular coupling-groove in its interior; a second-member fitting within the said first-member and having an annular coupling-shoulder on its exterior; and an expansible and contractible split coupling-ring located in the coupling-recess of the said first-member and engaging with the coupling-shoulder of the said second-member and disengageable from the said coupling-shoulder of the latter by being expanded; the said coupling-ring being accessible for being expanded as described by an instrument movable between the two said members.

8. A coupling-joint comprising: a first-member having a transverse coupling-shoulder in its interior; a second-member fitting within the said first-member and also having a transverse coupling-shoulder; a shiftable coupling-member normally interposed between the respective coupling-shoulders of the two said members, and disengageable from one thereof, to release the two said members; and releasing-means carried by one of the said members and movable with respect thereto into engagement with the said coupling-member to retire the same.

9. A coupling-joint comprising: a first-member having a transverse coupling-shoulder in its interior; a second-member fitting within the said first-member and also having a transverse coupling-shoulder; a flexible split coupling-ring engaging the respective shoulders of the two said members; and releasing-means carried by one of said members with capacity for movement with respect thereto and engageable with the said flexible split-ring to flex the same to its uncoupling position.

10. A coupling-joint comprising: a first-member having a transverse coupling-shoulder in its interior; a second-member fitting within the said first-member and also having a transverse coupling-shoulder; a shiftable coupling-member normally interposed between the respective coupling-shoulders of the two said members and disengageable from one thereof to release the two said members; and a rotary releasing-sleeve carried by one of the said members and movable in a helical path into engagement with the said coupling-member to retire the same.

RICHARD W. SHOEMAKER.